United States Patent [19]

Chung et al.

[11] Patent Number: 5,108,575
[45] Date of Patent: Apr. 28, 1992

[54] POLYAMINE ENAMINE CONTAINING CATIONIC RESIN

[75] Inventors: Ding Y. Chung, Rochester Hills; Tapan K. Debroy, Utica, both of Mich.

[73] Assignee: E. I. Du Pont de Nemours and Company, Wilmington, Del.

[21] Appl. No.: 564,688

[22] Filed: Aug. 8, 1990

Related U.S. Application Data

[62] Division of Ser. No. 483,856, Feb. 23, 1990, Pat. No. 4,980,398.

[51] Int. Cl.$^5$ .................... C25D 13/00; C08G 59/14; C08L 63/00; C08L 63/02
[52] U.S. Cl. ................. 204/181.7; 523/414; 523/415; 523/420; 528/45; 528/120; 528/121; 528/123
[58] Field of Search ............ 204/181.7; 523/415, 523/414, 420; 528/45, 120, 121, 123

[56] References Cited

U.S. PATENT DOCUMENTS

| | | | |
|---|---|---|---|
| 3,865,791 | 2/1975 | Brinkmann et al. | 528/68 |
| 4,017,438 | 4/1977 | Jerabek et al. | 524/901 |
| 4,104,147 | 8/1978 | Marchett et al. | 204/181.7 |
| 4,757,113 | 7/1988 | Paar | 528/45 |
| 4,830,722 | 5/1989 | Dobbelstein et al. | 204/181.7 |

*Primary Examiner*—John Niebling
*Assistant Examiner*—Steven P. Marquis
*Attorney, Agent, or Firm*—Hilmar L. Fricke

[57] ABSTRACT

Disclosed herein is a cathodic electrodepositable resin containing polyamine enamine. It has been discovered that reacting epoxy resins with polyamine enamine is a viable method of introducing amine functionality to the epoxy resin. The polyamine enamine route results in the desired high pH and stable dispersion in the electrocoat bath.

5 Claims, No Drawings

POLYAMINE ENAMINE CONTAINING CATIONIC RESIN

This is a division of application Ser. No. 07/483,856 filed Feb. 23, 1990, now U.S. Pat. No. 4,980,398.

TECHNICAL FIELD

The field of art to which this invention pertains is electrodepositable epoxy resins which contain polyamine enamine.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking. It is typically covered with any of a variety of different topcoat systems (e.g. (basecoat/clearcoat.)

The prior art of cathodic electrodepositable resin compositions, coating baths, and cathodic electrodeposition processes are disclosed in U.S. Pat. Nos. 3,922,253; 4,419,467; 4,137,140; and 4,468,307.

An important step in the production of the cathodic electrodepositable polymer is the introduction of the amine to the epoxy compound. This is needed in order to make the polymer water soluble through the use of an acid counter-ion. Typically the epoxy is reacted with primary and/or secondary amine. It is important to have a high pH and stable dispersion. Current commercial electrocoat systems typically use ketimenes to introduce the amine functionality to the epoxy resins. This well known process is described in U.S. Pat. No. 4,017,438 which is incorporated herein by reference. However, ketimene must be protected from moisture, and it is time consuming to prepare. There is a need for an alternate method (other than ketimene) for introducing the amine functionality to the epoxy resin.

SUMMARY OF THE INVENTION

It has been discovered that reacting epoxy resins with polyamine enamine is a viable method of introducing amine functionality to the epoxy resin. The polyamine enamine route results in the desired high pH and stable dispersion in the electrocoat bath. Furthermore, polyamine enamine is easier to prepare than ketimene and it is not moisture sensitive.

DETAILED DESCRIPTION OF THE INVENTION

As previously mentioned, it is well known that most principal emulsions in electrodeposition baths comprise an epoxy amine adduct blended with a cross-linking agent and neutralized with an acid in order to get a water soluble product. Typical crosslinkers which can be used in our invention are aliphatic and aromatic isocyanates such as hexamethylene diisocyanate, toluene diisocyanate, methylene diphenyl diisocyanate and so forth. These isocyanates are pre-reacted with a blocking agent such as oximes, alcohols, and caprolactams which block the isocyanate functionality (i.e. the crosslinking functionality). Upon heating, the blocking agents separate and crosslinking occurs. The blocked isocyanate crosslinkers which can be used in our invention are well known in the art and are described in detail in numerous patents such as U.S. Pat. No. 4,017,438 and in various other publications.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxy-3-tertiarybutylphenyl)propane, 1,1-bis-(4-hydroxyphenyl)ethane, 2-methyl-1,1-bis-(4-hydroxyphenyl) propane, 2,2-bis-(4-hydroxy-3-tertiarybutylphenyl)propane, bis-(2-hydroxynaphthyl) methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which enhances flow and coalescence. Examples of polyether polyols and conditions for chain extension are disclosed in U.S. Pat. No. 4,468,307. Examples of polyester polyols for chain extension are disclosed in U.S. Pat. No. 4,148,772.

The polyepoxide is reacted with a cationic group former, for example, an amine and then neutralized with an acid.

In the prior art, the amines used to adduct the epoxy resin are monoamines, particularly secondary amines with primary hydroxyl groups. When reacting the secondary amine containing the primary hydroxyl group with the terminal epoxide groups in the polyepoxide the result is the amine/epoxy adduct in which the amine has become tertiary and contains a primary hydroxyl group. Typical amines have been used in the prior art are methyl ethanol amine, diethanol amine and so forth.

In addition to the amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents. Mixtures of the various amines described above have also been used in the prior art.

It has been discovered that reacting epoxy resins with polyamine enamine is a viable method of introducing amine functionality to the epoxy resin. The polyamine enamine route results in the desired high pH and stable dispersion in the electrocoat bath. Furthermore, polyamine enamine is easier to prepare than ketimene and is not moisture sensitive.

It is known to produce enamines from C—H active dicarbonyl compounds, such as acetoacetate or 2,4 pentanedione, through reaction with primary amines in a polyamine. The polyamines of this invention have the following structure:

where $R_1$ is hydrogen, alkyl, or alkyl amine and $R_2$ is alkyl or alkyl amine.

The C—H active dicarbonyl compound has the following structure:

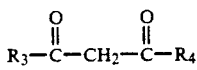

where $R_3$ is alkyl and $R_4$ is alkyl, alkoxy, or alkyl amine.

The reaction product of the above polyamine compound and C—H active dicarbonyl compound comprises a polyamine enamine having the following structure:

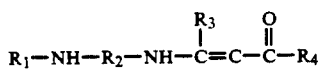

where $R_1, R_2, R_3,$ and $R_4$ are defined as above.

The byproduct of this reaction is water. It is not necessary to remove the water from the reaction mixture as this polyamine enamine carbonyl is stable in water.

The preferred polyamines of this invention are the alkylene polyamines and the substituted alkylene polyamines. Particularly preferred polyamines are diethylene triamine, triethylene tetramine, hexamethylene diamine and so forth. Most preferred is diethylene triamine.

The preferred C—H active dicarbonyl compounds of this invention are 2,4 pentanedione, ethyl acetoacetate and N-substituted acetoacetate amides. Most preferred is 2,4 pentanedione.

In the formation of the polyamine enamine, a stoichiometric amount of the C—H active dicarbonyl compound is added slowly to the polyamine compound. The reaction is exothermic. The preferred reaction temperature (controlled by rate of addition) is 45° C. to 100° C.

The reaction between the polyamine enamine and the epoxy resin takes place upon mixing the polyamine with the epoxy resin. The polyamine enamine may be reacted with the backbone epoxy resin at any stage where free epoxy groups remain in the backbone epoxy resin. The reaction is typically exothermic. If desired, the reaction mixture, may be heated to 50° C. to 130° C. for a sufficient time to assure completion of the reaction. It is also possible to use the polyamine enamine in conjunction with other secondary amines such as methyl ethanol amine and diethanol amine.

The reaction product of polyamine enamine with the polyepoxide resin attains its cationic character by at least partial neutralization with acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

The extent of cationic group formation of the resin should be selected such that when the resin is mixed with aqueous medium, a stable dispersion will form. A stable dispersion is one which does not settle, or is one which is easily redispersible if some sedimentation occurs. In addition, the resin should be of sufficient cationic character that the dispersed resin particles will migrate towards the cathode when there is an electrical potential between an anode and a cathode immersed in the aqueous dispersion.

In general, most of the cationic resins prepared by the process of the invention contain from about 10 to 300, preferably from about 30 to 100 milliequivalents of cationic group per hundred grams of resin solids.

The cationic resinous binder (the epoxy/polyamine enamine adduct) should preferably have weight average molecular weights, as determined by gel permeation chromatography using a polystyrene standard, of less than 100,000, more preferably less than 75,000 and most preferably less than 50,000 in order to achieve high flowability.

The cationic resin (the epoxy/polyamine enamine adduct) and the blocked isocyanate are the principal resinous ingredients in the principal emulsion and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 50:100, more preferably less than 40:100, and usually about 20 to 40:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 ®. These optional ingredients, when present, constitute from about 0.1 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0.1 to 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

Example A

A diethylene triamine (DETA)/2,4 pentanedione adduct was prepared by charging 500 parts of 2,4 pentanedione slowly to 515 parts of DETA under a nitrogen blanket. The reaction temperature was kept below 75° C. Upon completion of the addition, the mixture was cooled to room temperature, and decanted.

Example B

PREPARATION OF BACKBONE RESIN

The following components were charged into a suitable reactor vessel: 697 parts Epon 828 ® (diglycidyl ether of Bisphenol A from Shell Chemical Company having an epoxy equivalent weight of 188); 264 parts of polycaprolactone having a hydroxy equivalent weight of 264 (Tone 200 ® from Union Carbide Company); 198 parts of Bisphenol A; and 51 parts of xylene. The charge was heated to 145° C. under a dry nitrogen blanket and 1.2 parts of benzyl dimethyl amine were added. The reaction mixture was further heated to 160° C. and held for 1 hour. An additional 2.6 parts of benzyl dimethyl amine were added, and the mixture held at 147° C. until 1109 weight-per-epoxy (WPE) was achieved Methyl isobutyl ketone, 361 parts, was added. When the mixture was cooled to 65° C., 59 parts of methyl ethanol amine was added. When the exotherm stopped, DETA/2,4 pentanedione adduct (Example A) 41 parts, was added. The reaction mixture was brought to 82° C. and held at this temperature for 1.5 hours. The reaction mixture was cooled, and decanted.

Example C

Preparation of Quaternizing Agent

|  | Wt. | NV* |
|---|---|---|
| 2-Ethylhexanol half capped TDI in MIBK | 320.0 | 304.0 |
| Dimethylethanolamine | 87.2 | 87.2 |
| Aqueous Lactic Acid Solution | 117.6 | 88.2 |
| 2-Butoxyethanol | 39.2 | |
| Total | 564.0 | 479.4 |

*non volatiles

The quaternizing agent was prepared by adding dimethylethanolamine to the ethylhexanol half-capped toluene diisocyanate (TDI) in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

Example D

Preparation of Pigment Grinding Vehicle

|  | Wt. | NV |
|---|---|---|
| Epon 829 ® | 710.0 | 682.0 |
| Bisphenol A | 289.6 | 289.6 |
| 2-Ethylhexanol half capped TDI in MIBK | 406.0 | 386.1 |
| Quaternizing Agent from Ex. C | 496.3 | 421.9 |
| Deionized Water | 71.2 | |
| 2-Butoxyethanol | 1095.2 | |
| Total | 3068.3 | 1779.6 |

To form the pigment grinding vehicle Epon 829 ® (a diglycidyl ether of Bisphenol A from Shell Chemical Co.) and Bisphenol A were charged under a nitrogen atmosphere to a suitable reaction vessel and heated to 150°–160° C. to initiate an exothermic reaction. The reaction mixture was permitted to exotherm for one hour at 150°–160° C. The reaction mixture was then cooled to 120° C. and the 2-ethylhexanol half-capped toluene diisocyanate was added. The temperature of the reaction mixture was held at 110°-120° C. for one hour, followed by the addition of the 2-butoxyethanol. The reaction mixture was then cooled to 85°-90° C., homogenized and then charged with water, followed by the addition of the quaternizing agent (prepared above). The temperature of the reaction mixture was held at 80°-85° C. until an acid value of about 1 was obtained. The reaction mixture had a solids content of 58 percent.

Preparation of Emulsion: Example I

|  | Wt. | NV |
| --- | --- | --- |
| Backbone resin from Example B | 494 | 369 |
| Capped Isocyanate Crosslinker[1] | 284 | 199 |
| "Downol PPH" from Dow | 23 |  |
| Surfactant[2] | 6 |  |
| Deionized Water | 774 |  |
| Lactic acid | 20 |  |

[1]Polyurethane crosslinker formed from half-capping toluene diisocyanate (80/20 2,4/2,6 isomer mixture) with 2-ethyl hexanol and reacting this product with tri methylol propane in a 3:1 molar ratio. The crosslinker is present as a 70 percent solids solution in 2-ethoxy ethanol.
[2]Surfactant is a mixture of 120 parts "Amine C" from Ciba-Geigy, 120 parts acetylenic alcohol, commercially available as "Surfynol 104", 120 parts of 2-butoxy ethanol and 221 parts by weight of deionized water and 19 parts glacial acetic acid.

Thoroughly mix the backbone resin from Example I, polyurethane crosslinker, "Downol PPH", lactic acid, and surfactant. Then add the deionized water under agitation. The dispersion has a solid content of 36%. The pH is 6.8.

Preparation of Pigment Paste: Example II

|  | Wt. | NV |
| --- | --- | --- |
| Grind Vehicle from Example D | 266.20 | 154.64 |
| Deionized Water | 455.30 |  |
| Carbon Black | 25.98 | 5.98 |
| Aluminum Silicate | 51.85 | 51.85 |
| Lead Silicate | 22.24 | 2.24 |
| Dibutyl Tin Oxide | 16.34 | 16.34 |
| TIO2 | 296.23 | 296.23 |
| Total | 1134.56 | 567.28 |

The above ingredients were mixed together and ground in a mill to a Hegman No. 7 grind.

Preparation of Electrocoat Bath: Example III

|  | WT | NV |
| --- | --- | --- |
| Emulsion from Example I | 1561 | 562 |
| Pigment Paste from Example II | 438 | 218 |
| Deionized Water | 1903 | — |
| Total | 3900 | 780 |

A composition was prepared by blending the above ingredients. The coating composition has a pH of 6.0 and a bath conductivity of 1385 micro Siemens. The zinc phosphate cold-rolled steel panels were cathodically electrocoated in the electrodeposition bath at 275 volts for 2 minutes at a bath temperature of 83° F. The wet films were cured at 360° F. for 15 minutes. The film build is 0.9 mil. The film appearance is smooth, with good corrosion resistance.

We claim:

1. In a method of electrocoating an electrically conductive surface serving as a cathode comprising passing an electric current between said cathode and an anode in electrical contact with an aqueous electrodepositable composition wherein the aqueous electrodepositable composition comprises an acid solubilized epoxy amine adduct and a blocked polyisocyanate crosslinker; wherein the improvement comprises the epoxy amine adduct is formed by reacting an epoxy resin with a polyamine enamine which is the reaction product of
   i) a polyamine having the formula $$R_1-NH-R_2-NH_2$$

where $R_1$ is hydrogen, alkyl, or alkyl amine and $R_2$ is alkyl or alkyl amine; and
   ii) a C—H active dicarbonyl compound having the formula:

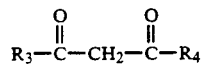

where $R_3$ is alkyl and $R_4$ is alkyl, alkoxy, or alkyl amine.

2. The method of claim 1 wherein the polyamine enamine has the formula

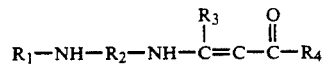

where $R_1$ hydrogen, alkyl, or alkyl amine; $R_2$ is alkyl or alkyl amine; $R_3$ is alkyl and $R_4$ is alkyl, alkoxy, or alkyl amine.

3. The method of claim 1 wherein the polyamine is diethylene triamine, triethylene tetramine or hexamethylene diamine.

4. The method of claim 1 wherein the C—H active dicarbonyl compound is 2,4 pentanedione, ethyl acetoacetate or N-substituted acetoacetate amides.

5. The method of claim 1 further comprising the reaction product of an epoxy/amine adduct and the blocked polyisocyanate crosslinker wherein the epoxy/amine adduct is the reaction product of a primary or a secondary amine with an epoxy resin.

* * * * *